Figure 1:
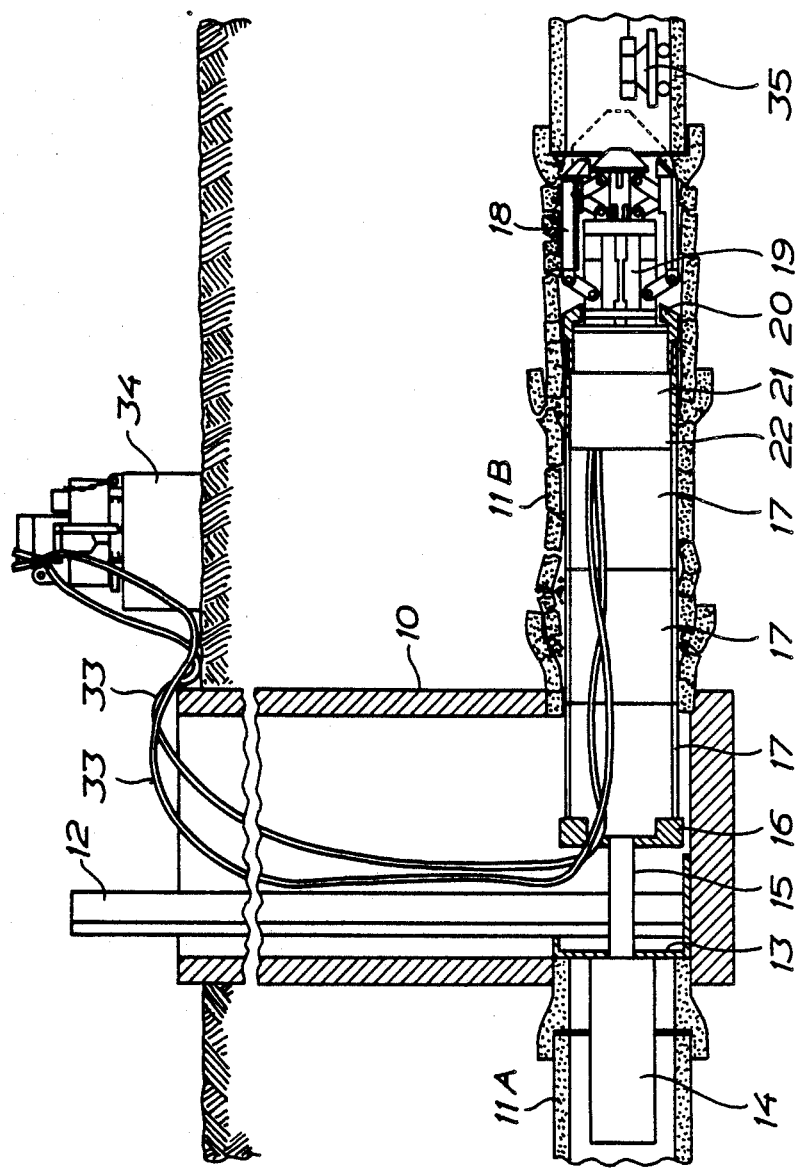

United States Patent [19]

Winkle et al.

[11] Patent Number: 4,930,542
[45] Date of Patent: Jun. 5, 1990

[54] METHOD FOR RESTORING UNDERGROUND PIPELINES

[75] Inventors: Sigvard Winkle; Henrik Persson, both of Malmö, Sweden

[73] Assignee: Entreprenadaktiebolaget E. & G. Jonsson, Malmo, Sweden

[21] Appl. No.: 349,894

[22] Filed: May 5, 1989

Related U.S. Application Data

[63] Continuation of Ser. No. 133,061, Sep. 15, 1987, abandoned.

[30] Foreign Application Priority Data

Nov. 25, 1985 [SE] Sweden ................................. 8505539

[51] Int. Cl.$^5$ ............................................. F16L 1/00
[52] U.S. Cl. .......................................... 138/98; 138/97; 405/154; 264/36
[58] Field of Search ............... 138/89, 97, 98; 285/15, 285/16, 17; 405/154, 184; 264/36, 269, 270, 267

[56] References Cited

U.S. PATENT DOCUMENTS

| | | | |
|---|---|---|---|
| 123,092 | 1/1872 | Divelbiss et al. | 405/184 |
| 3,750,711 | 8/1973 | Conklin et al. | 138/97 |
| 3,753,766 | 8/1973 | Brown et al. | 138/97 |
| 4,352,594 | 10/1982 | Vemura et al. | 405/184 |
| 4,507,019 | 3/1985 | Thompson | 138/97 |
| 4,634,313 | 1/1987 | Robbins | 138/97 |
| 4,647,256 | 3/1987 | Hahn et al. | 405/184 |

FOREIGN PATENT DOCUMENTS

| | | |
|---|---|---|
| 86567 | 8/1983 | European Pat. Off. . |
| 94694 | 11/1983 | European Pat. Off. . |
| 146331 | 6/1985 | European Pat. Off. . |
| 149528 | 7/1985 | European Pat. Off. . |
| 3119360 | 12/1982 | Fed. Rep. of Germany ........ 138/98 |
| 3123376 | 1/1983 | Fed. Rep. of Germany . |
| 425810 | 11/1982 | Sweden . |
| 325175 | 2/1930 | United Kingdom ................. 405/184 |
| 2079805 | 1/1982 | United Kingdom ................. 138/97 |
| 2164718 | 3/1986 | United Kingdom ................. 138/97 |

Primary Examiner—James E. Bryant, III
Attorney, Agent, or Firm—Merchant, Gould, Smith, Edell, Welter & Schmidt

[57] ABSTRACT

Method for restoring underground pipeline (11B) wherein short-pipes (17) are pressed one after the other intermittently into the pipeline end to end. An expansion piercer (18) or similar broaching tool is pushed through the pipeline at the leading end of the pipe string formed by the short-pipes and is brought to expand so as to split or, if splitting is not necessary, to widen the pipeline to substantially circular cross-sectional form.

3 Claims, 3 Drawing Sheets

METHOD FOR RESTORING UNDERGROUND PIPELINES

This is a continuation, of application Ser. No. 133,061, filed Sept. 15, 1987, abandoned.

The invention relates to a method for restoring underground pipelines by lining the existing pipeline with rigid short-pipes which are pressed intermittently one after the other into the pipeline from one end thereof, a new short-pipe being connected to the rear end of the pipe string during intervals between successive pressure steps.

A drawback of this relatively simple method of restoration is that the resistance when the pipe string is being pressed into the pipeline may be so great that there is a risk of the lining pipes being broken or damaged. This may occur due to the fact that the existing pipeline is distorted or has displaced joints, where the leading short-pipe may be hooked up. Moreover, deposits, sludge and roots in the pipeline may be pressed-in between the lining pipes and the inside surface of the pipeline. This happens particularly when a cone or similar element is mounted as a protector on the leading short-pipe. Another drawback is that the pipeline due to the lining will have a smaller inner diameter than the original one.

In order to overcome inter alia said latter drawback an implement can be drawn through the pipeline, which splits the pipeline (expansion device) such that short-pipes having the same dimension as the pipeline or even a larger dimension, may be drawn into the pipeline, but this method requires operation from both ends of the pipeline, which makes the method more complicated.

According to the invention, the drawbacks mentioned above which are encountered in applying the simple pressure technique are eliminated by the method of the invention.

SUMMARY OF THE INVENTION

There is disclosed a method for restoring underground pipeline wherein short-pipes are pressed one after the other intermittently into the pipeline end to end. An expansion piercer or similar broaching tool is pushed through the pipeline at the leading end of the pipe string formed by the short-pipes and is brought to expand so as to split or, if splitting is not necessary, to widen the pipeline to substantially circular cross-sectional form. Embodiments of greater and lesser scope are claimed.

Figure 2:
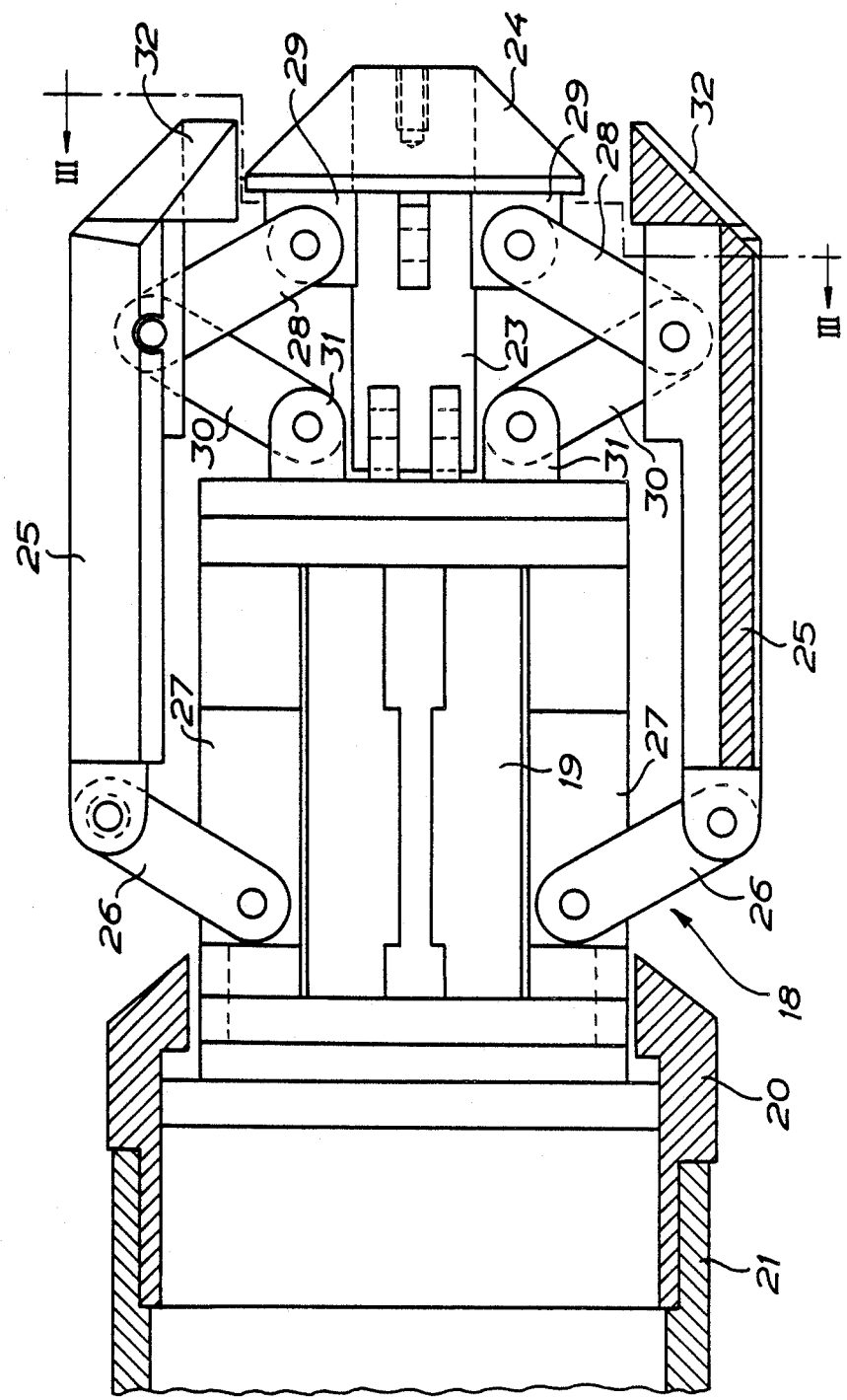
Figure 3:
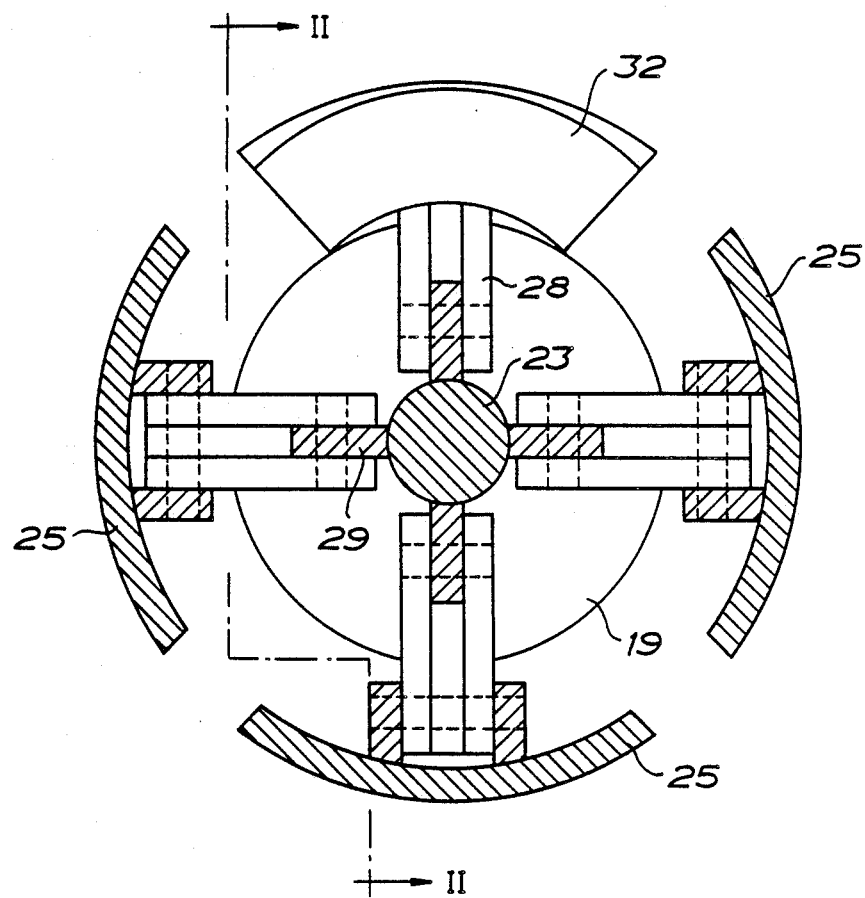

In order to explain in more detail the method of the invention an embodiment thereof will be described below, reference being made to the accompanying drawings in which FIG. 1 is a fragmentary vertical cross-sectional view of an underground pipeline with an existing or temporarily arranged manhole such as a well, when the method of the invention is being applied, FIG. 2 is a cross-sectional view along line II—II in FIG. 3 of an expansion piercer used in the method, and FIG. 3 is a cross-sectional view along line III—III in FIG. 2 of the expansion piercer.

In FIG. 1 which is first referred to, there is shown a manhole 10 from which underground pipelines 11A and 11B extend diametrically opposite each other. It is assumed that the two pipelines in the present case comprise socket-type concrete pipes. In the drawing, they are shown to be in intact condition, i.e. the pipes are in register, but in case of an old pipeline of any type, the conditions may be completely different. The pipes may be deformed or cracked. Some pipes may be displaced laterally—e.g. they may have sunk due to ground settling—and roots from trees may have grown into the pipeline which furthermore usually contains some sludge and deposits of a more or less solid consistency.

When the method of the invention is applied in order to restore the pipeline 11B, rigid short-pipes shall be pushed into the pipeline in a manner previously known. For this purpose there is lowered into the manhole 10 a standard or frame 12 which is provided at the lower end thereof with a counter pressure plate 13 and a double-acting hydraulic ram 14. A pressure plate 16 is mounted to the piston rod 15 of the ram. The counter pressure plate 13 is engaged with the inside surface of the manhole 10 so that it covers the opening of the pipeline 11A, the hydraulic ram 14 extending into said pipeline. Rigid short-pipes 17 which can consist of steel, plastic material or any other suitable material, are pressed intermittently into the pipeline 11B by means of the hydraulic ram 14, the pressure plate 16 being engaged with the outer end of the short-pipe to be pressed into the pipeline 11B. As short-pipes are pressed into the pipeline, new short-pipes will be joined to the rear end of the pipe string, and this takes place during some of the intervals between successive pressure steps.

In the forward end of the pipe string there is provided in practicing the method of the invention an expansion piercer generally indicated at 18, which is shown in more detail in FIGS. 2 and 3. The expansion piercer forming a broaching tool comprises a double-acting hydraulic ram 19 which is provided at the rear end thereof with a collar 20 which in turn supports a steel sleeve 21 extending rearwards, which has the same outside dimension as the short-pipes 17 and forms a shoulder portion 22 at the rear end thereof having an outside diameter such that it can be inserted into the leading short-pipe 17. The double-acting hydraulic ram 19 has a piston rod 23 projecting from the other end of the ram, and a conical head 24 is mounted to said piston rod. Four cylindrical segments 25 are supported at the rear end thereof by two links 26 which are pivoted to the associated segment and also to flanges 27 provided on the hydraulic cylinder 19, four flanges of this type being provided at right angles to each other. The segments are supported adjacent the forward end thereof by two links 28 which are pivoted to the associated segment at one end thereof and to a flange 29 which is connected to the piston rod 23 adjacent the head 24. These links 28 have the pivot point located on the segment in common with two links 30 pivoted at one end thereof to the associated segment at said pivot point and at the other end thereof to a lug 31 which is provided on the end cover of the hydraulic ram 19. The segments 25 have a bevelled portion 32 at the forward end thereof.

When the piston rod 23 is retracted, the segments 25 are in the position shown in FIGS. 2 and 3, which is the fully expanded position, but by the piston rod 23 being displaced to the right as seen in FIG. 2, the segments can be displaced radially and axially to a retracted position which is partly indicated by dot and dash lines in FIG. 1. In the retracted position, the bevelled portions 32 and the head 24 form a conical end portion of the expansion piercer, and in this position the outside periphery of the segments should have a dimension which is less than the inside dimension of the pipeline 11B so that the piercer unobstructedly can be pushed into the pipeline with the forward portion thereof which is defined on the outside thereof by the four segments. In the most expanded condition, the expansion piercer can have an outside dimension which is substantially larger than the inside dimension of the pipeline 11B.

As will be seen from FIG. 1, the expansion piercer is connected by hoses 33 with a hydraulic pump unit 34 located on the ground, and these hoses extend to the hydraulic ram 19 for supplying and draining hydraulic fluid to and from the opposite sides of the piston, respectively. When the method of the invention is to be applied, the expansion piercer 18 will be inserted into the pipeline 11B at the forward portion thereof the outside surface of which is defined by the segments 25, said segments being in the retracted condition. Since this portion of the piercer has an outside dimension which is less than the inside dimension of the pipeline 11B, the piercer can be pushed into the pipeline unobstructedly. When this has taken place, the piercer is brought to expand by the segments 25 being pressed outwards by means of the hydraulic ram 19, the piston rod 27 of which then will be displaced to the left. By the pressure then acting against the inside surface of the pipeline 11B it is achieved that the pipes of the pipeline will be split while the surrounding ground is being compressed, and that the passage through the pipeline as a consequence thereof will be widened. When the expansion piercer has been retracted, it is pushed by means of the hydraulic ram 14 the pressure plate 16 of which is engaged with the rear end of the sleeve 21, a further distance into the pipeline, the sleeve 21 arriving at the expanded portion of the pipeline. Then, the piercer will again be brought to expand so as to split a further portion of the pipeline 11B. Now, a short-pipe 17 will be fitted into the shoulder portion 22 of the sleeve 21, and when this short-pipe is pushed into the widened pipeline 11B by means of the hydraulic ram 14 the pressure plate 16 of which is engaged with the rear end of said short-pipe, the expansion piercer will also be displaced a further distance into the pipeline in order to be brought again to expand and to split a further portion of the pipeline. In this manner, the expansion piercer will be displaced intermittently, each displacement comprising a maximum length corresponding to the length of the segments 25. In intervals between the pressure steps provided by means of the hydraulic ram 14, the expansion piercer thus is brought to expand so as to split the pipeline 11B, the expansion piercer, however, being retracted during the pressure step in order to be moved unobstructedly a further distance into the pipeline. A pipe string will be built-up successively of the short-pipes 15 behind the expansion piercer and will be pressed into the widened pipeline 11B, a suitable connection and/or seal being provided between adjacent ends of the short-pipes.

In order that no parts of the split pipeline will fall into the mechanism of the expansion piercer and disturb the function thereof, protecting sheets may be provided on the expansion piercer e.g. on the segments 25 so as to protect the mechanism. Alternatively, the segments may overlap each other for the same purpose. Moreover, a further hose may be extended to the expansion piercer for cleaning the mechanism by the supply of pressurized air or water so that the mechanism can be cleaned by blowing or scavenging when considered necessary.

In order that the operation of the expansion piercer will be observed and the function thereof completely controlled, a TV camera 35 is pulled through the pipeline in front of the expansion piercer, said camera facing the expansion piercer, so that it is possible to observe continuously from ground level the forward end of the piercer and also to survey the portion of the pipeline located immediately in front of the piercer. The operation thus can be monitored and controlled very accurately. The short-pipes 17 will be pressed into the pipeline 11B very easily, because the pipeline can be widened to a suitable inside diameter by the pipes being split in order that the short-pipes without major frictional resistance can be pressed into the space remaining after the pipeline having been split. The expansion piercer will move substantially straight forward through the pipeline and thus will straighten out depressions or displacement of the joints between the pipes of the pipeline, if any, the operation of pressing the short-pipes 17 into the pipeline being greatly facilitated as a consequence thereof.

The mechanical means used for practicing the method of the invention can, of course, be modified. It is important, however, that the expansion piercer can be brought to expand against the inside surface of the pipeline while sufficient pressure being exercised in order to split the pipeline or when this is not necessary, to expand the pipeline only to substantially circular cross-sectional form, and that the hydraulic ram with the associated pressure and counter pressure plates can be arranged in the manhole 10 and can provide sufficient force in order to press the string of short-pipes 17 into the pipeline, while the expansion piercer in the retracted condition thereof is pushed through the pipeline at the forward end of the pipe string.

In case there is no pipeline 11A diametrically opposite to the pipeline 11B, an aperture preferably is made in the manhole 10 opposite to the pipeline 11B so as to make room for the hydraulic ram 14 in a digged-out space in the surrounding ground. The standard or frame 12 can be dispensed with or be replaced by other suitable means for locating the hydraulic ram 14 on the bottom of the manhole. The expansion piercer can be constructed for a large range of operation e.g. for an inside diameter of the pipeline which ranges from 100 to 700 mm. However, in order to cope with this diameter range, it is necessary to manufacture the expansion piercer in a number of different sizes. In a practical embodiment, the segments 25 have a length of about 40 cm and then there is obtained at each pressure step a displacement of the pipe string and the expansion piercer ranging from 15 to 20 cm. The displacement must not, of course, be larger than the axial length of the segments.

In some cases it may be suitable to replace the expansion piercer described with a cone of steel sheet which is pushed through the pipeline 11B at the leading end of the pipe string 17 and is provided with a vibrator built thereinto. By the steel sheet cone being vibrated, the pipeline will not be broken; it can be widened under the influence of the vibrations to substantially circular shape and displaced joints can be straightened out where necessary. The vibration need not take place during the intervals only, but may suitably be effected at the same time as the pipe string is pressed into the pipeline.

We claim:

1. Method for restoring underground pipeline by lining the existing pipeline with rigid short-pipes, comprising the steps of inserting into the pipeline from one end thereof an expansion piercer to be operated between an expanded condition of an outside dimension larger than the inside dimension of the pipeline, and a retracted condition of an outside dimension less than the inside dimension of the pipeline, said expansion piercer being in the retracted condition when being inserted into the pipeline; operating the expansion piercer to the expanded condition in an expansion step, the piercer pressing against the inside surface of the pipeline and widening the pipeline; operating the expansion piercer to the retracted condition in a retraction step following said expansion step; displacing the expansion piercer in the pipeline in the direction from said one end of the pipeline in the retracted condition after the retraction step by pressing the short-pipes intermittently after a retraction step one after the other into the pipeline from said one end thereof to produce said displacement; and repeating the expansion and traction steps and the following displacement to create a pipe string from the trailing end of the expansion piercer to said one end of the pipeline by connecting a further short-pipe to a rear end of the resulting string of pipes.

2. Method as claimed in claim 1, wherein said displacement is a distance which is less than the axial distance over which the expansion piercer can be pressed against the inside surface of the pipeline during expansion of the piercer.

3. Method as claimed in claim 1, wherein a TV camera is advanced through the pipeline in front of the expansion piercer for monitoring the piercer and the portion close to the piercer in front thereof.

* * * * *